United States Patent
Shantharam et al.

(10) Patent No.: US 11,237,817 B2
(45) Date of Patent: *Feb. 1, 2022

(54) OPERATING SYSTEM UPDATE MANAGEMENT FOR ENROLLED DEVICES

(71) Applicant: VMware, Inc., Palo Alto, CA (US)

(72) Inventors: Shravan Shantharam, Atlanta, GA (US); Vijay Narayan, Atlanta, GA (US); Kalyan Regula, Atlanta, GA (US); Varun Murthy, Atlanta, GA (US); Jason Roszak, Atlanta, GA (US); Achyutha Bharadwaj, Bangalore (IN); Abheesh Kumar Thaleppady, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/723,306

(22) Filed: Dec. 20, 2019

(65) Prior Publication Data

US 2020/0125357 A1  Apr. 23, 2020

Related U.S. Application Data

(63) Continuation of application No. 15/658,421, filed on Jul. 25, 2017, now Pat. No. 10,572,240.

(30) Foreign Application Priority Data

Dec. 19, 2016  (IN) .............................. 201641043279

(51) Int. Cl.
*G06F 8/65* (2018.01)
*G06F 8/61* (2018.01)
(Continued)

(52) U.S. Cl.
CPC .................. *G06F 8/65* (2013.01); *G06F 8/61* (2013.01); *H04L 67/34* (2013.01); *H04W 4/08* (2013.01)

(58) Field of Classification Search
None
See application file for complete search history.

(56) References Cited

U.S. PATENT DOCUMENTS 7,478,381 B2 *  1/2009  Roberts ..................... G06F 8/65
                                                   717/168
7,480,907 B1 *  1/2009  Marolia .................... G06F 8/65
                                                   717/127

(Continued)

OTHER PUBLICATIONS

Overton, "MicrosoftWindows Intune 2.0: Quickstart Administration", 2012, PACKT enterprise (Year: 2012).*

(Continued)

*Primary Examiner* — Hossain M Morshed
(74) *Attorney, Agent, or Firm* — Thomas | Horstemeyer LLP (57) ABSTRACT

Operating system update management for enrolled devices is disclosed according to various examples. In one example, a computing environment can publish, to an agent application on a client device, a deployment profile with a setting that specifies a restriction associated with download or installation of software updates by a subset of client devices that includes the client device. The computing environment can receive, from the agent application, an identification of a software update available for the client device. The computing environment can receive a specification of the subset of client devices to apply the software update. In response to a predefined interaction being performed, for example, by an administrator, the computing environment can direct at least one client device in the subset to install the software update.

20 Claims, 8 Drawing Sheets

(51) Int. Cl.
   *H04L 29/08* (2006.01)
   *H04W 4/08* (2009.01)

(56) References Cited

U.S. PATENT DOCUMENTS

| | | | | |
|---|---|---|---|---|
| 8,245,218 B2* | 8/2012 | Giambalvo | ............... | G06F 8/65 717/172 |
| 8,838,635 B2* | 9/2014 | Mulligan | ................... | G06F 8/61 707/759 |
| 8,971,538 B1* | 3/2015 | Marr | ........................ | G06F 8/65 380/285 |
| 9,535,684 B2* | 1/2017 | Hiltgen | .................... | G06F 8/60 |
| 10,572,240 B2* | 2/2020 | Shantharam | ............ | H04L 67/34 |
| 2005/0132349 A1* | 6/2005 | Roberts | .................... | G06F 8/65 717/168 |
| 2010/0242033 A1* | 9/2010 | Fritsch | ................. | H04L 67/303 717/171 |
| 2010/0242037 A1 | 9/2010 | Xie et al. | | |
| 2011/0302574 A1* | 12/2011 | Yoshikawa | ............... | G06F 8/65 717/173 |
| 2012/0192173 A1* | 7/2012 | Price | ......................... | G06F 8/65 717/172 |
| 2014/0007073 A1* | 1/2014 | Cavalaris | .................. | G06F 8/63 717/172 |
| 2015/0074658 A1* | 3/2015 | Gourlay | ................... | F24F 11/30 717/172 |
| 2015/0242198 A1* | 8/2015 | Tobolski | ................... | G06F 8/65 717/172 |
| 2016/0132805 A1* | 5/2016 | Delacourt | ................ | G06F 8/71 705/7.23 |
| 2018/0131721 A1* | 5/2018 | Jones | ................. | H04L 63/0861 |
| 2020/0099773 A1* | 3/2020 | Myers | ................ | H04L 67/1095 |

OTHER PUBLICATIONS

Oracle, Database Mobile Server Administration and Deployment Guide:, 2015, https://docs.oracle.com (Year: 2015).

Overton, David. "Microsoft Windows Intune 2.0: Quickstart Administration." Packt Publishing Ltd, 2012.

* cited by examiner

| | Last Updated | Update Details | Platform | Type | Assigned Groups | Installed Status |
|---|---|---|---|---|---|---|
| | 1 hr | Microsoft.NET® Framework Update for Windows® 8.1 and... | Windows Desktop | Feature Pack | Windows 7<br>IT Admin | ⊘ 7<br>① 2<br>☺ 9 ← 157a |
| | 20m | Security Update for 145a Windows® 8.1 (KB3124280) | Windows Desktop | Security Update | All Windows 10 | ⊘ 2200<br>① 1100<br>☺ 3300 |
| | 45m | Security Update for 145b Apple® OS X | OS X | Security Update | Mac Users | ⊘ 450 ← 157b<br>① 130<br>☺ 580 |
| | 45m | Security Update for 145c Windows® Phone 8.1 | Windows Phone | Security Update | Windows Phone 8.1 Users | ⊘ 682 ← 157c<br>① 412<br>☺ 1094 |
| | 45m | Security Update for 145d Apple® OS X | OS X | Security Update | Mac Users | ⊘ 241 ← 157d<br>① 339<br>☺ 580 |
| | 45m | Update for 145e Microsoft® Outlook® | Windows Desktop | Security Update | IT Whole Group | ⊘ 17 ← 157e<br>① 3<br>☺ 20 ← 157f |

145f

169

| Rsmith's Desktop running Windows 10.0.10586 | | | | | Query | Send | Lock | ▽ More |
|---|---|---|---|---|---|---|---|---|
| Dell Latitude E6630 \| 10.0.10586 \| Ownership: Employee Owned | | | | | | | | |

Summary  Compliance  Profiles  Apps  Content  Updates  More▽

22 Updates Available  20 Updates Approved  14 Updates Installed

| ☐ Status | Update Name | Type | Approval Status | | | |
|---|---|---|---|---|---|---|
| ☐ ⊘ | Security Update Windows® (KB337789... | Security | Approved | ⊙ | ✖ | ✔ |
| ☐ ⊘ | Toolkit for Visual Studio® SDK (KB3834... | Tools | Approved | ⊙ | ✖ | ✔ |
| ☐ ⊘ | Cumulative Security Update for Internet Explorer®... | Security | Approved | ⊙ | ✖ | ✔ |
| ☐ ⊘ | Security Update Windows® (KB33778965) | Critical | Not Approved | ⊙ | ✖ | ✔ |
| ☐ ⊘ | Security Update Windows® (KB33778965) | Security | Approved | ⊙ | ✖ | ✔ |
| ☐ ⊘ | Cumulative Security Update for Internet Explorer®... | Service Pack | Approved | ⊙ | ✖ | ✔ |
| ☐ ⊘ | Microsoft.NET® Update (KB3350555... | Feature Pack | Approved | ⊙ | ✖ | ✔ |
| ☐ ⊘ | Security Update Windows® (KB354546... | Security | Not Approved | ⊙ | ✖ | ✔ |
| ☐ ⊘ | Security Update Windows® (KB879451...) | Security | Not Approved | ⊙ | ✖ | ✔ |
| ☐ ⊘ | Security Update Windows® (KB1891498... | Security | Approved | ⊙ | ✖ | ✔ |
| ☐ ⊘ | Defender Update (KB9845954... | Security | Approved | ⊙ | ✖ | ✔ |
| ☐ ⊘ | Microsoft® Office® Update (KB2164561... | Tools | Approved | ⊙ | ✖ | ✔ |

1 2 3 4 5 6 7 8 9 10▶ ▶▶    Items 1-20 of 259

OPERATING SYSTEM UPDATE MANAGEMENT FOR ENROLLED DEVICES

RELATED APPLICATION

This application is a continuation of and claims the benefit of co-pending U.S. patent application Ser. No. 15/658,421, filed Jul. 25, 2017, entitled "OPERATING SYSTEM UPDATE MANAGEMENT FOR ENROLLED DEVICES," with benefit claimed under 35 U.S.C. 119(a)-(d) to Foreign Application Serial No. 201641043279 filed in India entitled "OPERATING SYSTEM UPDATE MANAGEMENT FOR ENROLLED DEVICES," filed Dec. 19, 2016, by VMware, Inc., both of which are incorporated herein by reference in their entireties.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, an enterprise can require the employee to enroll with a management service capable of protecting enterprise data from theft, data loss, and unauthorized access. Administrators of the management service can utilize the management service to oversee operation of the devices enrolled with or otherwise managed by the service.

Operating systems, applications, drivers, and other software components on enrolled devices often require periodic updates to fix security vulnerabilities, improve performance, remove bugs, or perform similar functions. For instance, an update to an operating system can be installed on a device to correct an error, flaw, failure, or fault in a previous version of the operating system that causes it to produce an incorrect or unexpected result. However, when an operating system or other software component is updated on a device, incompatibilities are often created as a result of an application, driver, or other software component not being able to integrate with the new version of the operating system. As a result, an update to an operating system can cause particular software or hardware to stop functioning as intended.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a drawing of an example user interface of an administrator console rendered in the networked environment to manage software updates for client devices enrolled with the management service.

DETAILED DESCRIPTION

The present disclosure relates to operating system update management for enrolled devices. Different types of computing devices can have one or more of a multitude of operating systems installed thereon. For example, devices brought into a given workplace can have either the Microsoft® Windows®, Apple iOS®, Android®, Ubuntu® Linux, or other operating system installed thereon. Additionally, these devices can include a variety of applications, drivers, and related components. As can be appreciated, each of the numerous types of operating systems, applications, drivers, and other software or hardware components provide varying degrees of features, capabilities, and restrictions. As the restrictions and capabilities differ for each operating system, an administrator must be aware of a multitude of differences and nuances prior to managing and configuring enrolled devices.

Further, the operating systems, applications, drivers, and other software components installed on a device often require periodic updates to fix security vulnerabilities, improve performance, remove bugs, or perform other similar functions. However, when an operating system or other software component is updated on a device, incompatibilities are often created as a result of an application or other software component not being able to integrate with the update. For example, an update to an operating system may cause particular applications to stop functioning as intended. When an application is programmed to invoke a function call to a library of an operating system, any alteration to the function through an update can cause the functionality of the application to deviate as intended. As can be appreciated, agent applications that operate in conjunction with a management service to oversee operation of a device can be impaired as a result of an update. For example, if an update causes an agent application to not function as intended, enterprise data can become vulnerable to data loss or unauthorized access.

According to various examples as will be described herein, a management service can oversee software updates performed on devices enrolled with or otherwise managed by the management service. As a result, software updates performed on devices can be managed such that software updates are not installed that can subject the device to data loss or unauthorized data access. Additionally, software updates can be managed for a large number of devices remotely through use of an administrator console although each device can include varying hardware or software components.

In one example, an agent application executing on an enrolled device can identify when a software update becomes available for the device. When a software update is identified, the agent application can communicate information pertaining to the software update to a management service. For example, the agent application can send an identifier that uniquely identifies the software update to the management service. Additionally, the agent application can prevent the software update from being installed on the enrolled device until authorized by an administrator.

The management service can use the identifier, or other information pertaining to the software update, to query a service to identify information pertaining to the software update. Information pertaining to the software update can include, for example, a type of the update, a severity level, or other information. The information pertaining to the software update available for one or more enrolled devices can be shown in an administrator console, which can include a series of one or more user interfaces used by an administrator to manage enrolled devices. In one example, an administrator can specify groups or other subsets of the client devices to which to apply the software update. The subsets may be specified according to a user group, as will be described.

Figure 1:
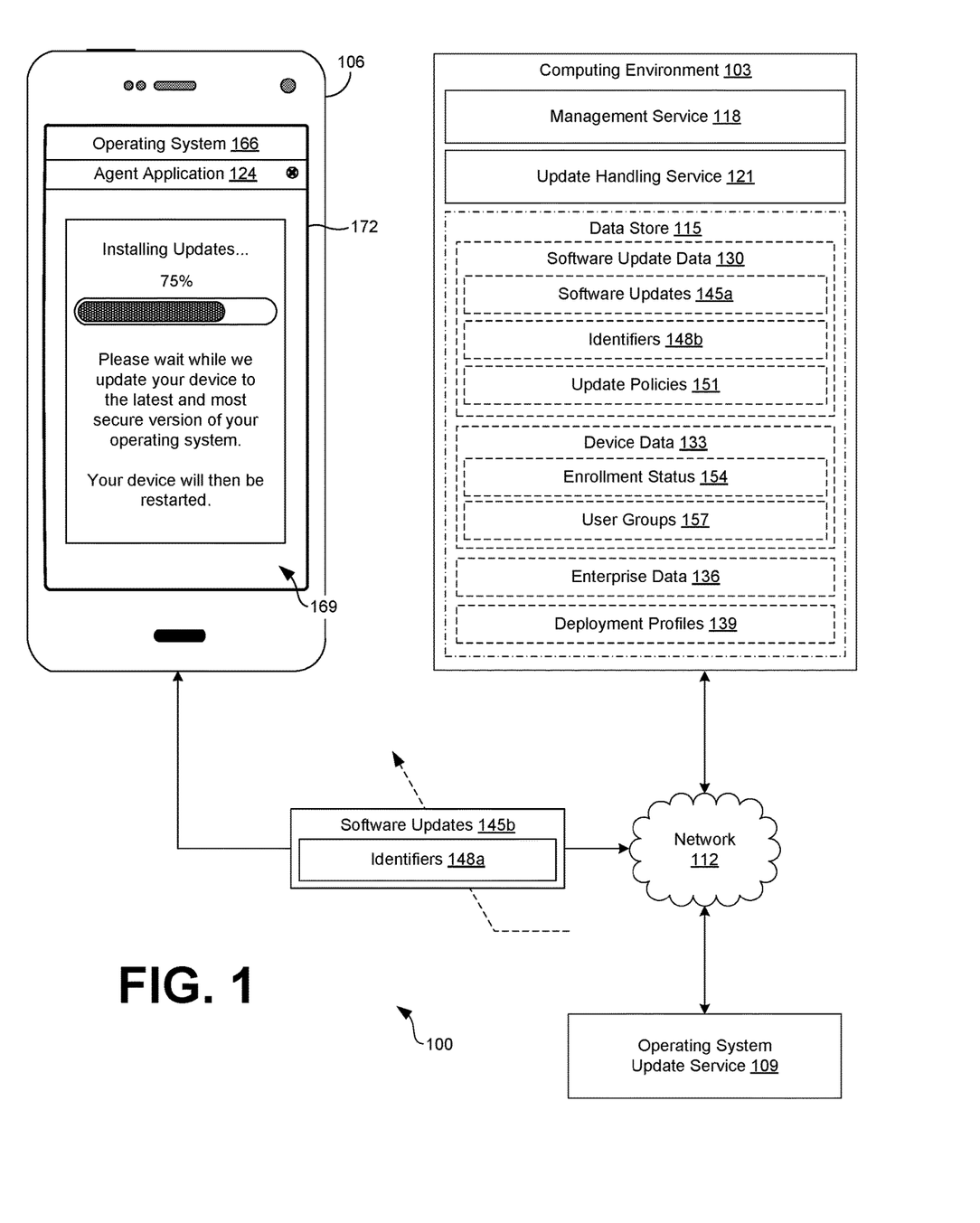
FIG. 1 is a drawing of a networked environment including a management service, an update handling service, a client device, and an operating system update service.

With reference to FIG. 1, shown is an example of a networked environment 100. The networked environment 100 can include a computing environment 103, a client device 106, and an operating system update service 109 in communication with one another over a network 112. The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 112, the computing environment 103 can be described as a "remote" computing environment 103.

The data store 115 can include memory of the computing environment 103, mass storage resources of the computing environment 103, or any other storage resources on which data can be stored by the computing environment 103. The data stored in the data store 115, for example, can be associated with the operation of the various applications or functional entities described below.

The components executed on the computing environment 103 can include, for example, a management service 118, an update handling service 121, as well as other applications, services, processes, systems, engines, or functionality not discussed in detail herein. The management service 118 can be executed to oversee the operation of client devices 106 enrolled with the management service 118. In some embodiments, an enterprise, such as one or more companies or other organizations, can operate the management service 118 to oversee or manage the operation of the client devices 106 of its employees, contractors, customers, or other users having user accounts with the management service 118.

As referred to herein, enrollment of a client device 106 with the management service 118 can include the client device 106 subscribing or registering with the management service 118 such that the management service 118 can manage or oversee operation of the client device 106. A device identifier that uniquely identifies the client device 106 can be stored in the data store 115 in association with a user of the client device 106, an organization or entity associated with the client device 106, as well as other information. In one example, enrollment of the client device 106 with the management service can include authenticating a user of the client device 106 using authentication data, such as an email address, a username, a password, a personal identification number (PIN), biometric information or other data.

Enrollment of the client device 106 can further include the management service 118 causing various software components to be installed on a client device 106. Such software components can include, for example, client applications, resources, libraries, drivers, device configurations, or other similar components that require installation on the client device 106 as specified by an administrator of the management service 118. The management service 118 can further cause compliance policies and policies to be installed and implemented on a client device 106. Policies can include, for example, restrictions or permissions pertaining to capabilities of a client device 106 such that access to enterprise data is secured on the client device 106.

The management service 118 can interact with one or more client applications executed on the client device 106. In one example, the management service 118 interacts with an agent application 124 on the client device 106 to enroll the client device 106 with the management service 118. Enrollment of the client device 106 can include the agent application 124 being registered as a device administrator of the client device 106, which can provide the agent application 124 with sufficient privileges to control the operation of the client device 106. In one example, the agent application 124 can be registered as the device administrator through the installation of a management profile at the operating system of the client device 106 that causes the operating system to designate the agent application 124 as the device administrator.

The management service 118 can direct the agent application 124 to perform device management functions on the client device 106. For example, the management service 118 can direct the agent application 124 to control access to certain software or hardware functions available on the client device 106. In one example, the agent application 124 can permit or restrict access to particular software applications on the client device 106. In another examples, the agent application 124 can permit or restrict access to camera functions, global positioning system (GPS) modules, networking hardware, such as Bluetooth® modules and mobile hotspots, or other hardware functions. As a result, the management service 118 can verify that the configuration and operation of the client device 106 is in conformance with predefined criteria that ensures that enterprise data, or other data, is protected from data loss, unauthorized access, or other harmful event.

The management service 118 can further provision enterprise data to the client device 106 through the agent application 124. In one example, the management service 118 can cause the agent application 124 to control use of the client device 106 or provision enterprise data to the client device 106 through use of a command queue provided by the management service 118. In some examples, the management service 118 can store commands in a command queue associated with a particular client device 106 and can configure an agent application 124 to retrieve the contents of the command queue. In one example, the agent application 124 can be configured to retrieve the contents of the command queue on a configured interval, such as every four hours, or upon detection of a certain event, such as detection of an unauthorized application being executed by the client device 106.

In any case, the agent application 124 can retrieve the contents of the command queue by checking in with the management service 118 and requesting the contents of the command queue. In one example, the contents of the command queue can include a command that the agent application 124 should cause to be executed on the client device 106. In another example, the contents of the command queue can include a resource or client application that the agent application 124 should cause to be installed on the client device 106, which the client device 106 may access through a specified uniform resource locator (URL).

The update handling service 121 is executed to generate one or more user interfaces to obtain information about the configuration of client devices 106 enrolled (or to be enrolled) with the management service 118 through an administrator console. An administrator or other appropriate user can provide information in the administrator console regarding how the administrator desires to configure the client devices 106. In one example, the administrator can specify a software update to be installed on a client device 106 or a multitude of client devices 106 associated with a particular user group. Through the administrator console, a deployment profile can be generated and published that causes the agent application 124 to configure the device in accordance with the deployment profile. When published, the management service 118 or the agent application 124 on a client device 106 can identify the deployment profile as being applicable to a client device 106 and, as a result, will download and install the software update specified by the administrator.

The data stored in the data store 115 can include, for example, software update data 130, device data 133, enterprise data 136, deployment profiles 139, as well as other data. The software update data 130 includes information pertaining to software updates 145a ... 145b (collectively "software updates 145") capable of being deployed or installed on client devices 106. Software updates 145 can include, for example, an operating system update, an application update, a driver update, a firmware update, or other update to a software component of the client device 106. To this end, the software update data 130 can include identifiers 148a ... 148b (collectively "identifiers 148") as well as update policies 151. The identifiers 148 can include strings of alphanumeric characters that uniquely identifies a corresponding one of the software updates 145. For instance, an identifier 148 can be used to retrieve information associated with a particular software update 145 from the data store 115 or the operating system update service 109.

The update policies 151 can include constraints specified by an administrator for a client device 106 to be in "compliance" with the management service 118. The update policies 151 can include compliance rules or other criteria. In one example, the agent application 124 can configure hardware or software functionality of a client device 106 such that the client device 106 is in conformance with the update policies 151. For instance, an administrator can specify particular types of software updates 145 that are automatically installed on the client devices 106. Additionally, the agent application 124 can identify when the client device 106 is not in conformance with the update policies 151, as well as other policies, and can take appropriate remedial actions, such as denying access to enterprise data 136, denying installation of a software update 145, or other features of the agent application 124. In further examples, remedial actions can include, for example, encrypting enterprise data 136 such that the enterprise data 136 cannot be accessed until the client devices 106 comes into conformance with the update policies 151, denying access to sharing functions, such as network-based file transfers, restricting execution of certain client applications, or similar functions.

In some examples, the management service 118 communicates with the agent application 124 or other client application executable on the client device 106 to determine whether vulnerabilities exist on the client device 106 that do not satisfy update policies 151. Vulnerabilities can include, for example, the presence of a virus or malware on the client device 106, the client device 106 being "rooted" or "jail-broken" where root access is provided to a user of the client device 106, the presence of particular applications or files, questionable device configurations, vulnerable versions of client applications, or other vulnerability as can be appreciated. The software update data 130 can include additional information pertaining to software updates 145, as will be described.

Generally, deployment profiles 139 include data associated with a configuration of a client device 106 enrolled or managed by the management service 118. For instance, the agent application 124 can configure a client device 106 as specified by an applicable deployment profile 139. Deployment profiles 139 can include, for example, data generated by an administrator that deploys software updates 145, or other data, to a client device 106. Through an administrator console, an administrator can create a deployment profile 139 for a client device 106, or group of client devices 106, for a software update 145 to be applied. In one example, the deployment profile 139 includes an extensible markup language (XML) document generated by the computing environment 103 for interpretation by the agent application 124.

Device data 133 can include, for example, data pertaining to an enrollment status 154 for individual ones of the client devices 106. In one example, a client device 106 designated as "enrolled" can be permitted to access the enterprise data 136 while a client device 106 designated as "not enrolled" or having no designation can be denied access to the enterprise data 136. Device data 133 can also include data pertaining to user groups 157. An administrator can specify one or more of the client devices 106 as belonging to a particular user group 157. The management service 118 can use a deployment profile 139 applicable to the particular user group 157 to instruct the agent application 124 to download specified software updates 145 as well as perform an installation of the software updates 145.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 166 configured to execute various client applications, such as the agent application 124 or other application. Some client applications can access network content served up by the computing environment 103 or other servers, thereby rendering a user interface 169 on a display 172, such as a liquid crystal display (LCD), touch-screen display, or other type of display device. To this end, some client applications can include a browser or a dedicated application, and a user interface can include a network page, an application screen, or other interface. Further, other client applications can include device management applications, enterprise applications, social networking applications, word processors, spreadsheet applications, media viewing application, or other applications.

The operating system update service 109 can include a service independent from those of the computing environment 103 and operated by an entity who oversees software updates 145 for a particular platform of operating system 166. For example, the operating system update service 109 can include the Windows® Server Update Services (WSUS) operated by Microsoft® or similar services. The operating system 166 can communicate with the operating system update service 109 to periodically check for software updates 145.

Next, a general description of the operation of the various components of the networked environment 100 is provided. As noted above, different types of client devices 106 can be enrolled with the management service 118 where each of the client devices 106 can have different hardware and software configurations. For instance, the client devices 106 enrolled with the management service 118 can include different operating systems 166, client applications, and drivers. Under many standard configurations, the client devices 106 will periodically communicate with an operating system update service 109 or similar service to receive various software updates 145.

In some examples, an operating system update service 109 is executed in an "on premise" device, thereby requiring the client device 106 be connected to a particular network and have an assigned internet protocol (IP) address in a range of IP addresses for the client device 106 to receive communications from the operating system update service 109. The client devices 106 enrolled with the management service 118 would not obtain software updates 145 unless connected to the particular network.

Accordingly, in some examples, the computing environment 103 can oversee software updates 145 performed on client devices 106 enrolled with or otherwise managed by the management service 118 regardless of whether the client devices 106 are "on premise" or located elsewhere. The client device 106 can periodically receive notifications pertaining to available software updates 145 from the operating system update service 109, as can be appreciated. Instances of the agent application 124 executing on a client device 106 can identify when one or more software updates 145 become available on the client device 106. For example, the agent application 124 can identify through an operating system 166 of the client device 106 when a software update 145 becomes available for the client device 106.

When a software update 145 is identified as being available on a client device 106, the agent application 124 can communicate information pertaining to the software update 145 to the management service 118 over the network 112.

For example, the agent application 124 can send an identifier 148 that uniquely identifies the software update 145 to the management service 118. Additionally, the agent application 124 can ensure that various actions are not taken on the client device 106. For instance, the agent application 124 can ensure that the software update 145 is not installed on the client device 106 until authorized by an administrator of the management service 118. In one example, the agent application 124 can configure the operating system 166 of the client device 106 to disable automatic updates. In another example, a setting can be configured by the agent application 124 on the client device 106 that requires administrator approval before installing any software updates 145. Once an administrator pushes this setting, for example, through a deployment profile 139, the client device 106 will not install any software updates 145 until an administrator approves the software updates 145.

As the computing environment 103 receives information about software updates 145 available to the client devices 106, the computing environment 103 can aggregate data pertaining to the software updates 145 in an administrator console such that an administrator can specify which software updates 145 to deploy on client devices 106. In one example, the identifier 148 for a software update 145 received from a client device 106 can be used to query a service to identify information pertaining to the software update 145. For example, the computing environment 103 can query the operating system update service 109 or other service to identify information pertaining to the software update 145 using the identifier 148.

In some examples, the information obtained as a result of the query includes, for example, a type of the update, a revision number, a title of the update, a description of the update, an update classification, a date and time when the metadata for the revision of the update finished downloading, a date and time when the revision of metadata for the update was authored, whether the update is a WSUS infrastructure update, whether the update was declined on the client device 106, a severity rating, a publication state of the update, an original source of the update, a knowledge base (KB) article number that describes an issue related to or fixed by the update, a security bulletin number that describes security issues and changes that are related to the update, whether the update installation program may request input from the user, whether the installation of the update requires network connectivity, impact to the user and other applications when installing the update on the client device 106, restart behavior of the update, as well as other information.

In addition to aggregating the software updates 145 for display in an administrator console, the computing environment 103 can identify user groups 157 that could be associated with the software update 145. For instance, if the software update 145 is an update to an operating system 166, all user groups 157 corresponding to the operating system 166 can be identified. The administrators can use the administrator console to specify which software updates 145 to apply (or not apply) to particular ones of the client devices 106. To this end, the administrator console can include a series of one or more user interfaces 169 used by administrators to manage client devices 106 enrolled with the management service 118.

Through the administrator console, an administrator can specify particular sets of client devices 106 to receive a software update 145. In one example, the administrator can specify user group 157 to which the software update 145 is to be applied. In another example, the administrator can specify individual ones of the client devices 106 to which to apply the software update 145.

When a software update 145 has been specified by an administrator through the administrator console, the computing environment 103 can instruct the specified client devices 106 to download the software update 145 from the management service 118, the operating system update service 109, or other appropriate service. In one example, the computing environment 103 can generate a deployment profile 139 that is accessed by the agent application 124 which instructs the agent application 124 to download and install a software update 145. In some examples, the deployment profile 139 is an XML, document or similar type of file.

Through a deployment profile 139, the computing environment 103 can instruct the agent application 124 executing on the client device 106 to perform a download and an installation of the software update 145. For example, the deployment profile 139 can instruct client devices 106 to download the software update 145 from the management service 118, the operating system update service 109, or other suitable service. While the user interface 169 of FIG. 1 shows an installation of a software update 145 in the display 172, the installation of a software update 145 can be a silent installation, or an installation performed as a background process where no user input is required.

Referring next to FIG. 2, shown is an example of a user interface 169 of an administrator console generated by the computing environment 103 to oversee and manage operation of the client devices 106 enrolled (or to be enrolled) with the management service 118. Specifically, the user interface 169 of FIG. 2 permits an administrator to oversee the deployment of various software updates 145 available for client devices 106 enrolled with the management service 118. The computing environment 103 can periodically obtain information pertaining to software updates 145a . . . 145f available for various types of client devices 106 and display the information in the user interface 169 for access by an administrator.

For example, through the administrator console, an administrator can access information pertaining to the software update 145 to determine whether a software update 145 should be installed on the client devices 106. The administrator can determine whether a software update 145 may create incompatibilities with various operating systems 166, applications, drivers, or other software components that may be needed to ensure the protection of enterprise data 136.

As can be appreciated, user groups 157a . . . 157f can be created by administrators and associated with particular operating systems 166, applications, drivers, or other software components. In some examples, when a software update 145 becomes available, the computing environment 103 can automatically identify user groups 157 that may be subject to the software update 145. For instance, if the software update 145 is an update to the "Windows® Desktop" platform (or operating system 166), all user groups 157 corresponding to the "Windows® Desktop" platform can be identified. Through the administrator console, an administrator can specify which software updates 145 to apply (or not apply) to particular ones of the client devices 106. For example, the first one of the software updates 145a shown in FIG. 2 (the "Microsoft®.NET Framework Update for . . . ") can be deployed on all client devices 106 associated with the first user groups 157a (the "Windows® 7" user group 157 and the "IT Admin" user group 157).

The user interface 169 can include various information associated with software updates 145, such as the information obtained from the operating system update service 109. Additionally, the user interface 169 can include information pertaining to a deployment of a software update 145 to a user group 157 or collection of user groups 157. For example, the first one of the software updates 145a is shown as pending installation on two devices while having been installed on seven devices (for a total of nine devices in the user groups 157).

Figure 3:
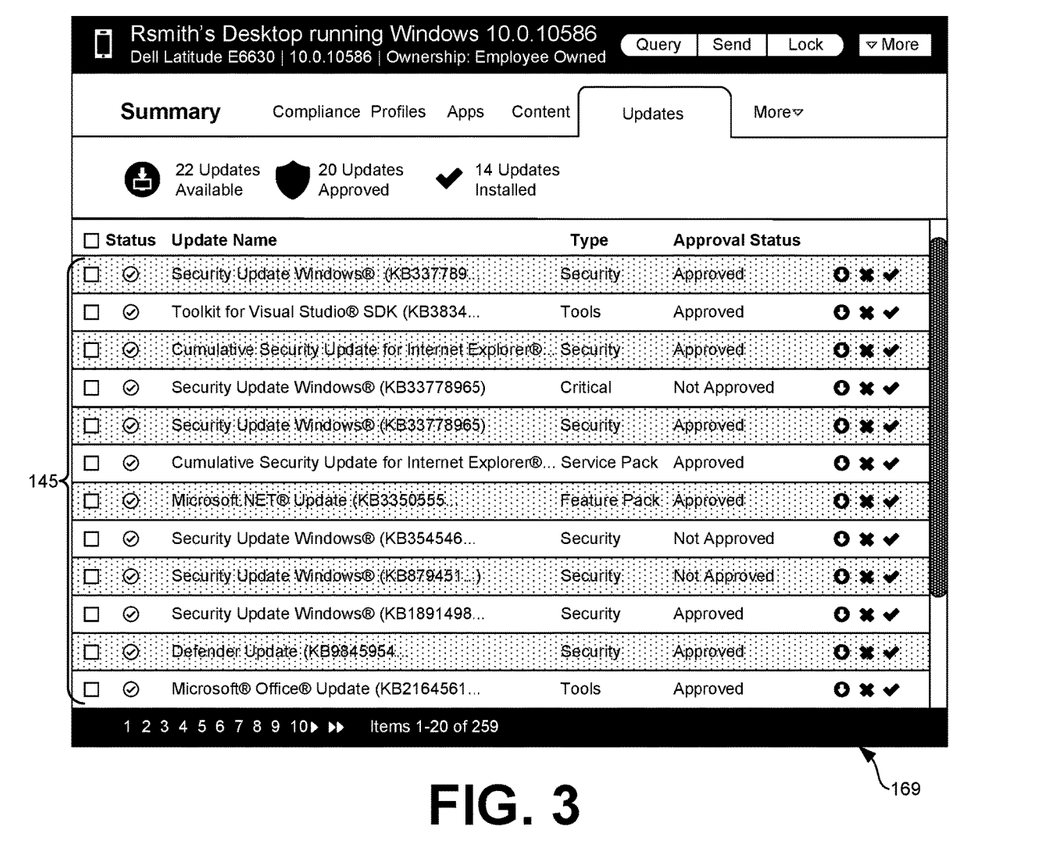
FIG. 3 is a drawing of another example user interface of the administrator console rendered in the networked environment to manage software updates for a particular client device enrolled with the management service.

Turning now to FIG. 3, shown is another example of a user interface 169 of an administrator console generated by the computing environment 103. The computing environment 103 can generate a user interface 169 to provide an administrator with all software updates 145 available to a particular one of the client devices 106 ("Rsmith's Desktop") enrolled with the management service 118. In some examples, the administrator can use the user interface 169 shown in FIG. 3 to cause installations or removals of software updates 145 on the client device 106. For instance, software updates 145 can be shown in the user interface 169 to await approval by the administrator. Based on an approval of a software update 145, a deployment profile 139 can be generated that causes an agent application 124 executable on the client device 106 to cause installation of the software update 145 on the client device 106.

As can be appreciated, installation of software updates 145 may not be instantaneous. Accordingly, the administrator console can provide an administrator with a status of installation (or removal) of individual ones of the software updates 145. In the example of FIG. 3, the user interface 169 shows that 22 software updates 145 are available for the client device 106, 20 of the software updates 145 have been approved by an administrator, and 14 of the software updates 145 have been installed on the client device 106. As can be appreciated, two of the software updates 145 await approval from an administrator before being deployed on the client device 106.

Figure 4A:
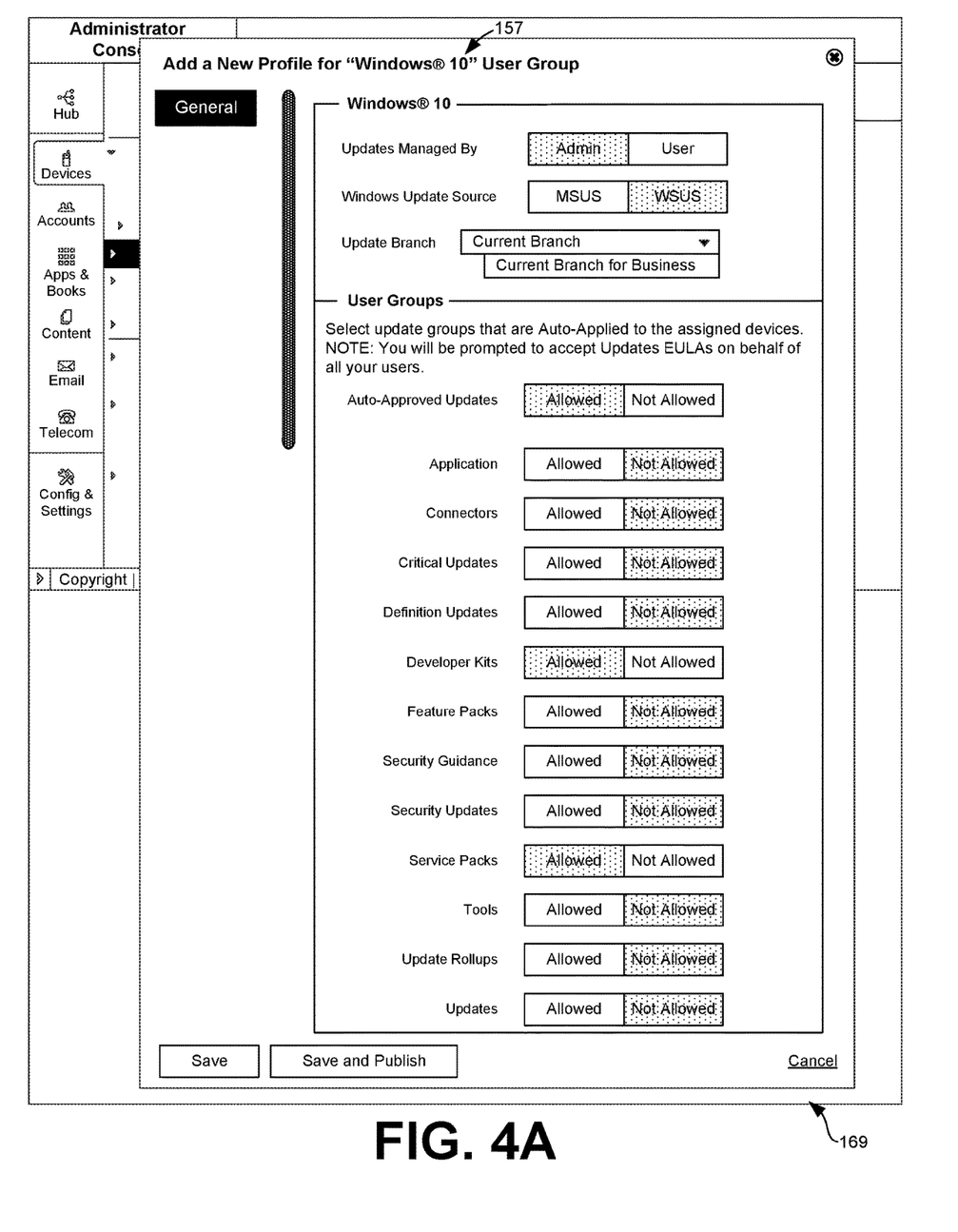
FIGS. 4A and 4B are drawings of other example user interfaces of the administrator console rendered in the networked environment to manage software updates for client devices enrolled with the management service.

Turning now to FIG. 4A, another example of a user interface 169 of an administrator console is shown. In the example of FIG. 4A, the user interface 169 can be used to oversee creation of a deployment profile 139. In the example, a deployment profile 139 can cause an installation or a removal of a software update 145. For example, an agent application 124 executable on a client device 106 can access the deployment profile 139 to ensure that the client device 106 is in conformance with the deployment profile 139. To this end, in some examples, a deployment profile 139 can correspond to an individual one of the client devices 106. In other examples, a deployment profile 139 can correspond to a user group 157 that includes a multitude of client devices 106.

In the user interface 169, an administrator can specify, for example, whether installation of software updates 145 on client devices 106 belonging to the "Windows® 10" user group 157 are managed by an administrator or a user of the client device 106. Additionally, the administrator can designate a source of the software update 145. For example, the software update 145 can be obtained from the operating system update service 109, the computing environment 103, or from another suitable service.

Further, the administrator can designate types of the software updates 145 that can automatically be installed on client devices 106. For instance, the administrator can designate whether applications, connectors, critical updates, definition updates, developer kits, feature packs, security guidance, security updates, service packs, tools, update rollups, or other type of software updates 145 are to automatically be installed on client devices 106 associated with the "Windows® 10" user group 157. As can be appreciated, a deployment profile 139 is generated for the user group 157 based on the input provided by the administrator and is made available to the client devices 106 associated with the user group 157.

Figure 4B:
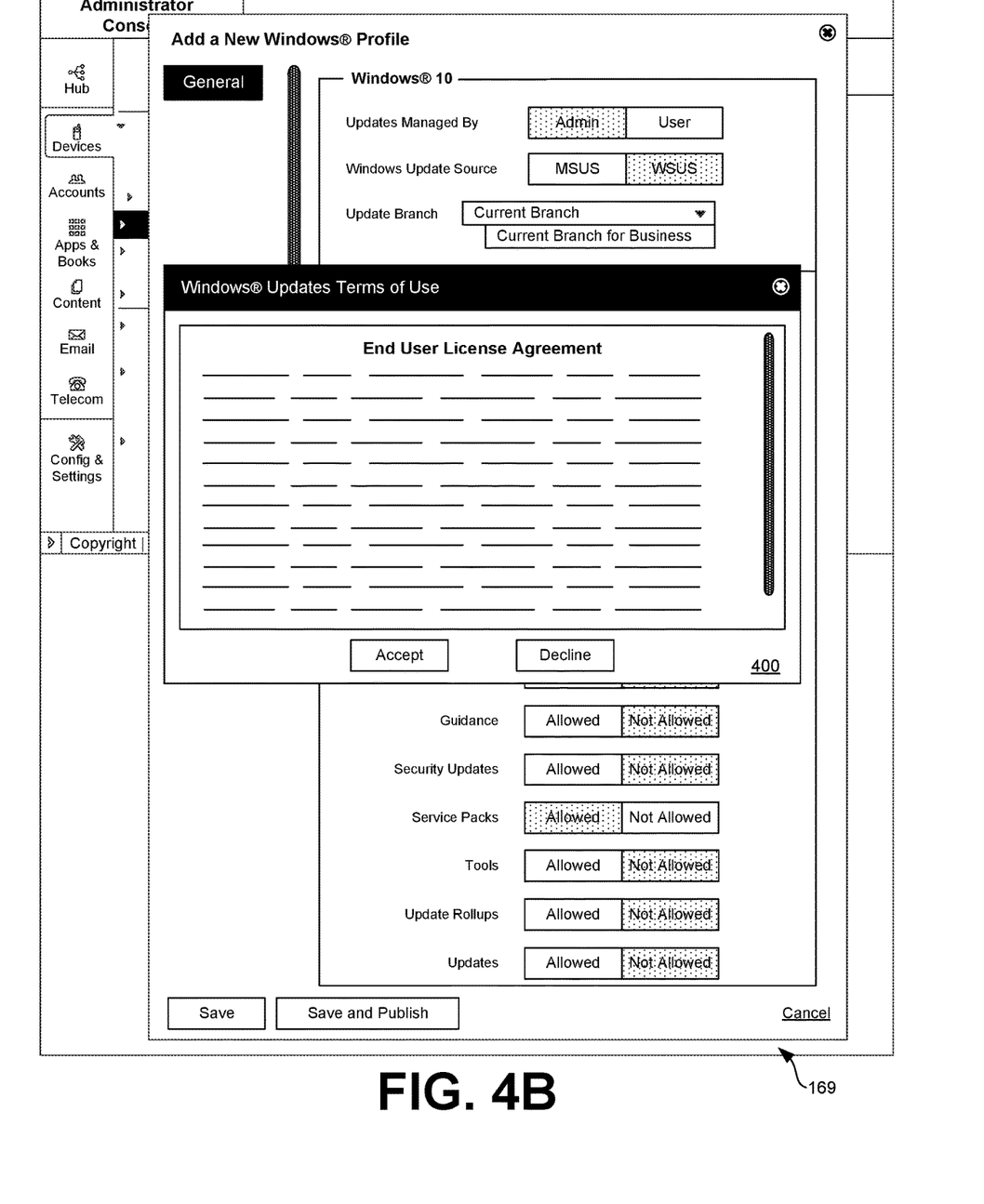

Referring next to FIG. 4B, another example of a user interface 169 of an administrator console is shown. The user interface 169 of FIG. 4B can include a dialog 400 generated during creation of a deployment profile 139. As the software updates 145 can be installed silently on client devices 106, the administrator can be required to accept or decline terms of one or more end user license agreements (EULAs) associated with applicable software updates 145.

Figure 5:
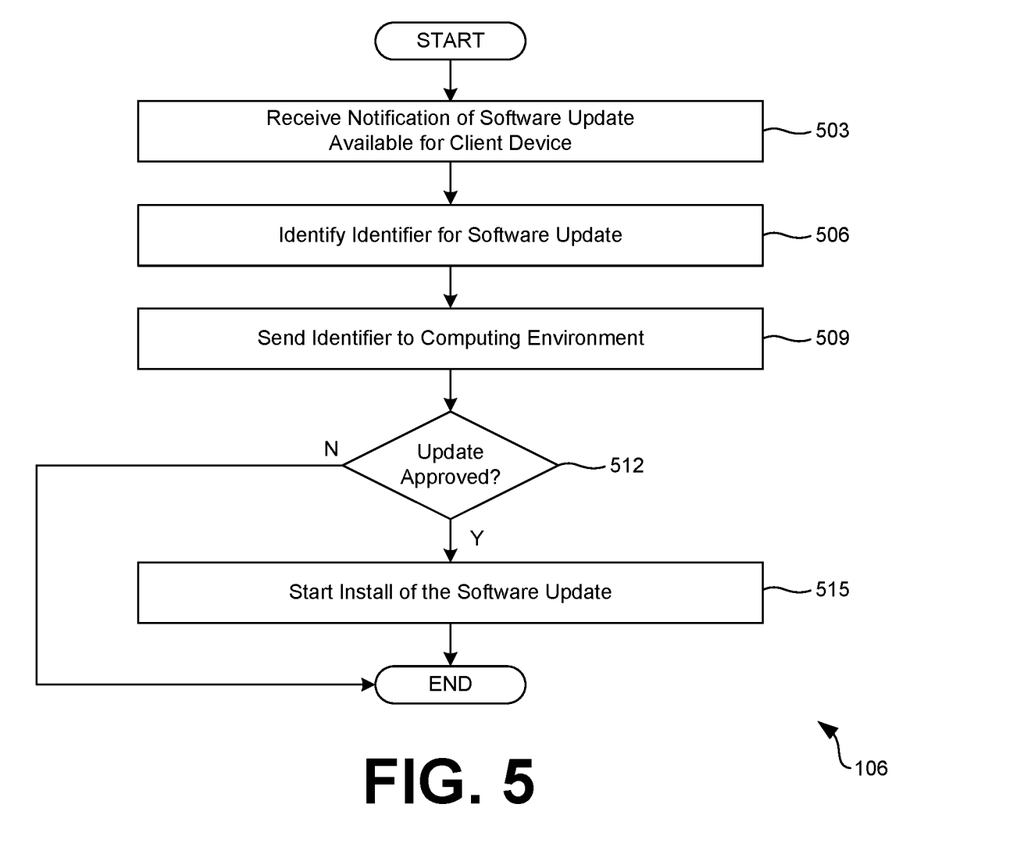
FIG. 5 is a flowchart illustrating functionality implemented by components of the networked environment.

Moving on to FIG. 5, shown is a flowchart that provides one example of the operation of a portion of the client device 106. The flowchart of FIG. 5 can be viewed as depicting an example of elements of a method implemented by the agent application 124, the operating system 166, or other suitable software component according to one or more examples. The separation or segmentation of functionality as discussed herein is presented for illustrative purposes only.

In step 503, the client device 106 can receive a notification of a software update 145 available for the client device 106. In one example, an operating system 166 of a client device 106 receives periodic communications from the operating system update service 109 pertaining to software updates 145 available to the client device 106 based on a current configuration of the client device 106. For instance, the operating system update service 109 can identify that the operating system 166 of the client device 106 is out-of-date. The agent application 124 executing on the client device 106 can communicate with the operating system 166 or directly to the operating system update service 109 to identify software updates 145 available for the client device 106. In one example, the agent application 124 can generate and execute a command line argument to identify software updates 145:

% windir %\system32\wuauclt.exe/detectnow where wuauclt.exe is an operating system application and the command line argument "/detectnow" causes the application to check for software updates 145 on behalf of the operating system 166. The operating system application can return a list of available software updates 145 as well as an identifier corresponding to each of the software updates 145.

Next, in step 506, the client device 106 can access an identifier 148 for the software update 145, for example, from the list provided in response to running the command line argument described above with reference to step 503. The identifier 148 can include, for example, a series of alphanumeric characters capable of uniquely identifying the software update 145. In some examples, the agent application 124 can prevent the software update 145 from being installed or applied until directed by the computing environment 103.

Thereafter, in step 509, the identifier 148 can be sent to the computing environment 103. As can be appreciated, in some examples, the administrator can be required to approve the software update 145 prior to installation of the software update 145 on the client device 106. In other examples, however, the administrator can have previously designated particular types of software updates 145 that can be automatically deployed on certain client devices 106 or client devices 106 associated with specified user groups 157.

In step 512, the client device 106 can determine whether the software update 145 has been approved for installation on the client device 106 by the computing environment 103. If the update has not been approved, the process can proceed to completion.

Alternatively, if the software update 145 has been approved, the process can proceed to step 515 where the client device 106 can start installation of the software update 145. In some examples, the agent application 124 can generate a command line argument to start an installation of the software update 145. Additionally, the installation of the software update 145 can be performed silently, as a background process unnoticeable by the user of the client device 106, based on a tag of the command line argument. Thereafter, the process can proceed to completion.

Figure 6:
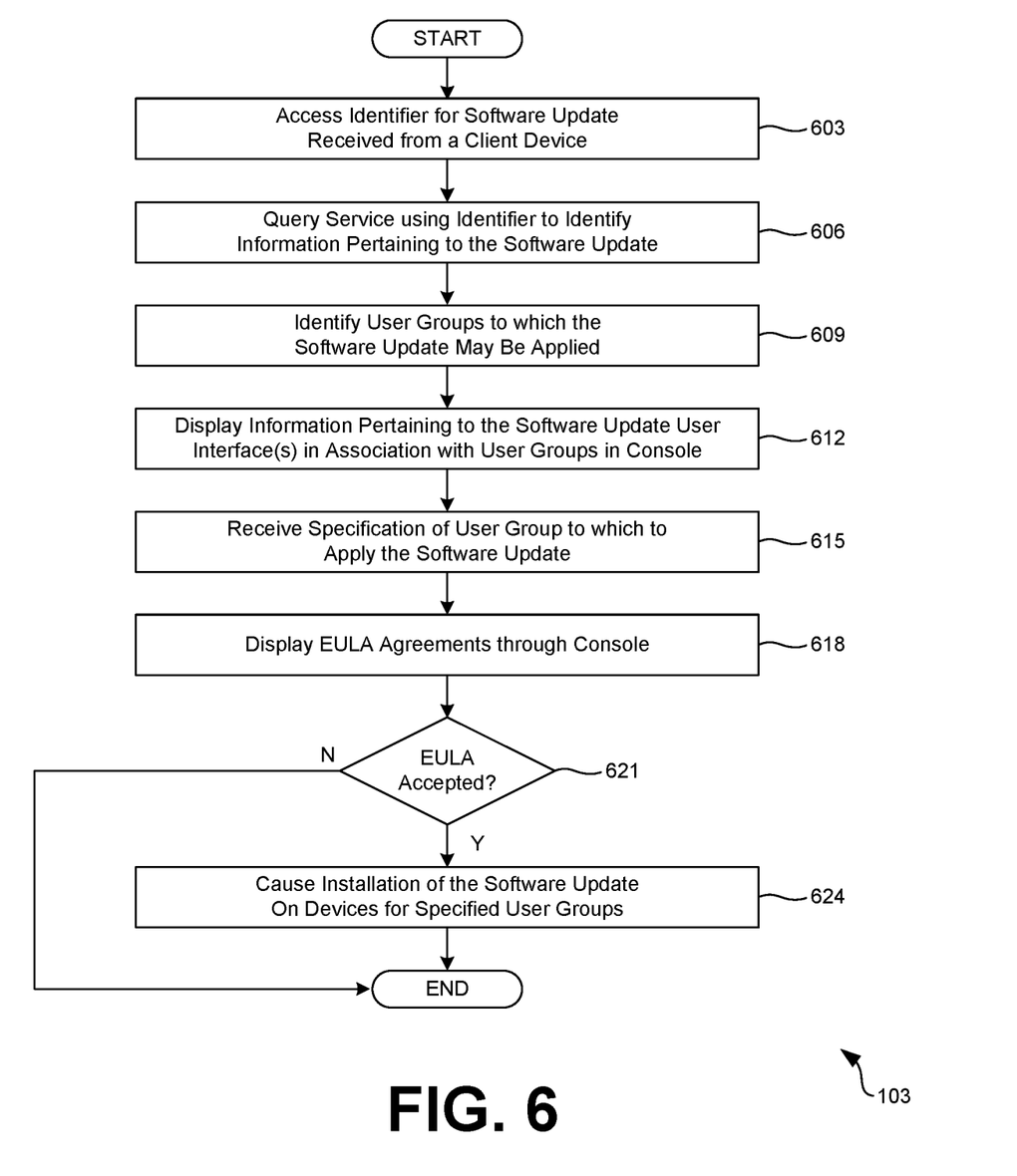
FIG. 6 is a flowchart illustrating functionality implemented by components of the networked environment.

Moving on to FIG. 6, shown is a flowchart that provides one example of the operation of a portion of the computing environment 103. The flowchart of FIG. 6 can be viewed as depicting an example of elements of a method implemented by the management service 118 or the update handling service 121 executable in the computing environment 103 according to one or more examples. The separation or segmentation of functionality as discussed herein is presented for illustrative purposes only.

According to various examples, the computing environment 103 can oversee software updates 145 performed on client devices 106 enrolled with or otherwise managed by the management service 118. As a result, software updates 145 performed on devices can be managed such that software updates 145 are not installed that can subject the device to data loss or unauthorized data access. To this end, the agent application 124 executing on a client device 106 can be configured to identify when one or more software updates 145 become available on the client device 106. In one example, the agent application 124 can check for available software updates 145 periodically by generating and executing a command line argument, as described above with respect to step 503. Additionally, the agent application 124 can communicate information pertaining to the one or more software updates 145 to the management service 118. In some examples, the identifier can be generated by an entity providing the software update 145 that uniquely identifies the software update 145. For example, the agent application 124 can send an identifier 148 that uniquely identifies the software update 145 to the management service. Also, the agent application 124 can delay or prevent installation of the one or more software updates 145 being installed on the enrolled device until authorized by an administrator.

In step 603, the identifier 148 for a software update 145 received from a client device 106 can be accessed for analysis. For example, additional information pertaining to the software update 145 (as described below in step 606) can be accessed using the identifier 148 to assist the administrator in determining whether the software update 145 will cause any incompatibilities on a client device 106, whether a severity level of the software update 145 indicates the software update 145 is urgent, whether an author of the software update 145 is trusted, or other determination.

For example, an administrator can view information associated with the software update 145 in an administrator console to determine whether the software update 145 can cause any incompatibilities on a client device 106, determine whether a severity level of the software update 145 indicates the software update 145 is urgent, determine whether an author of the software update 145 is a trustworthy source, or make other determinations that can assist in authorizing or denying deployment of a software update 145. The administrator can then make an informed decision whether to authorize or prevent a software update 145 from being installed on a client device 106. For instance, certain characteristics of a software update 145 can indicate a trustworthiness of the software update 145, such as a type of the update, a revision number, or a publication date indicative of the software update 145.

In one example, an administrator can use a revision number associated with a software update 145 to determine whether similar software updates 145 having the same revision number are stable when installed on other client devices 106, or determine whether the similar software updates 145 are incompatible with various client devices 106. In another example, the revision number can indicate whether a software update 145 is the most recently released version of the software update 145. As can be appreciated, the most recently released version or most recent publication date may include the most stable release of a software update 145.

In another example, a type of the update, a title of the update, a description of the update, or an update classification can be indicative of an urgency or severity level of the software update 145. For example, a software update 145 having a type, name, or description that includes "Security Update" can indicate a high urgency or severity level, as opposed to updates to standard applications, such as a word processing application. Software updates 145 designated as a "Security Update," for example, can include a patch that fixes network, encryption, or other security vulnerabilities on a client device 106. A severity rating specified by a publisher can similarly indicate that the software update 145 has a high urgency or severity level. For example, some software updates 145 can be designated as "Critical" by a publisher of the software update 145 that can be indicative that the software updates 145 should be considered for deployment.

Even further, an administrator can inspect an author or an original source of a software update 145, or whether the software update 145 is a WSUS infrastructure update, to determine whether the software update 145 is from a trusted source. For instance, if an author of the software update 145 is a network security entity or an entity that distributes an operating system 166, such as WSUS, the software update 145 can be deemed trustworthy, as opposed to software updates 145 received from uncommon, unknown, or malicious sources.

In some examples, an administrator can consult a security bulletin using a security bulletin number associated with the software update 145, where the security bulletin contains information that describes security issues and changes that are related to the software update 145. In some situations, the security bulletin can include a listing of incompatible devices, operating systems 166, drivers, or other configurations. Similarly, in some examples, an administrator can consult a knowledge base (KB) article using a KB article number that describes an issue related to or fixed by the software update 145. If the security bulletin or KB article indicates numerous incompatibilities, the administrator can abstain from authorizing the software update 145.

A date and time when the metadata for the revision of the update finished downloading or a date and time when the revision of metadata for the update was authored can assist an administrator in determining whether the software update 145 is available for client devices 106 other than the client device 106 from which the software update 145 was received.

Additionally, the administrator can desire to deploy software updates 145 silently on client devices 106 where little or no interruptions are made to a user of the client device 106. To this end, the administrator can determine whether an update installation program may request input from the user based on the software update 145, identify whether the installation of the update requires network connectivity, determine the restart behavior of the software update 145, or identify an impact to the user and other applications when installing the software update 145 on the client device 106.

In some examples, the administrator can specify certain criteria that, if met, causes an automatic authorization or denial of a software update 145. For example, the computing environment 103 can determine whether a severity level of the software update 145 exceeds a threshold previously set by an administrator. If the severity level of a software update 145 exceeds the threshold, the software update 145 can automatically be installed or, alternatively, if the severity level of the software update 145 does not exceed the threshold, the software update 145 can be denied or require manual approval by the administrator before being deployed on client devices 106.

In another example, the administrator can specify trusted authors of software updates 145. For instance, if an author of the software update 145 is included in a trusted author database, the software update 145 can be automatically approved for installation. Hence, the administrator can specify various thresholds, conditions, or combinations thereof that allow for automated approval or installation of software updates 145. In another example, an administrator can specify that any software updates 145 that have a publication state of "expired" require manual approval by an administrator before being deployed on client devices 106 or, alternatively, software updates 145 having a publication state of "deployed" be automatically approved for installation on client devices 106.

Hence, in step 606, the identifier 148 can be used to query a service to identify information pertaining to the software update 145. In one example, the computing environment 103 can query the operating system update service 109 to identify information pertaining to the software update 145. The operating system update service 109 may be a service operated by an entity who oversees updates for an operating system. For example, the operating system update service 109 can include WSUS operated by Microsoft® or similar services.

In some examples, the information obtained as a result of the query includes, for example, a type of the update, a revision number, a title of the update, a description of the update, an update classification, a date and time when the metadata for the revision of the update finished downloading, a date and time when the revision of metadata for the update was authored, whether the update is a WSUS infrastructure update, whether the update was declined, a severity rating, a publication state of the update, an original source of the update, a knowledge base (KB) article number that describes an issue related to or fixed by the update, a security bulletin number that describes security issues and changes that are related to the update, whether the update installation program may request input from the user, whether the installation of the update requires network connectivity, impact to the user and other applications when installing the update on the client device, restart behavior of the update, as well as other information.

In step 609, one or more user groups 157 to which the software update 145 may be applied can be identified. For example, user groups 157 can be created for a particular operating system of a client device 106. If a software update 145 is recognized for the particular operating system, the user group 157 can be identified from various user groups 157 as being a user group 157 to which the software update 145 may be applied.

Next, in step 612, the information pertaining to the software update 145 can be displayed in an administrator console, for example, in association with the user groups 157 identified in step 609. The administrator console, as described above, can include a series of one or more user interfaces 169 used by administrators to manage client devices 106 enrolled with the management service 118.

In step 615, a specification of a user group 157 to which the software update 145 is to be applied is received, for example, through the administrator console. In one example, an administrator can specify subsets of the client devices 106 to which to apply the software update 145. For example, in the user interface 169 of FIG. 2, the administrator can specify particular software updates 145 to apply to particular user groups 157. In some examples, the administrator can automate selection and approval of types of software updates 145 based on, for example, prior attempts to install similar software updates 145, as well as knowing whether the prior software updates 145 caused any issues or performed successfully.

Next, in step 618, the computing environment 103 can obtain a EULA associated with the software update 145 and present the EULA to an administrator, for example, through the administrator console. In one example, the EULA for the software update 145 can be presented to the administrator in a dialog 400 or other appropriate component of a user interface 169. In other examples, the EULA for the software update 145 can be sent to client devices 106 for acceptance by an end user.

In step 621, the computing environment 103 can determine whether the EULA has been accepted by an administrator, a user of a client device 106, or other appropriate user. If the EULA is not accepted by an administrator or an end user, the process can proceed to completion. Alternatively, if the EULA is accepted, the process can proceed to step 624.

In step 624, the computing environment 103 can cause installation of the software update 145 on the client devices 106 for the specified user groups 157. In one example, the computing environment 103 can instruct the subset of the plurality of client devices 106 to download the software update 145 from the management service 118 or the operating system update service 109. For example, the computing environment 103 can instruct individual instances of the agent application 124 installed on the subset of the client devices 106 to perform an installation of the software update 145. In some examples, the installation can be a silent installation, or an installation performed as a background process where no user input is required. Thereafter, the process can proceed to completion.

Figure 7:
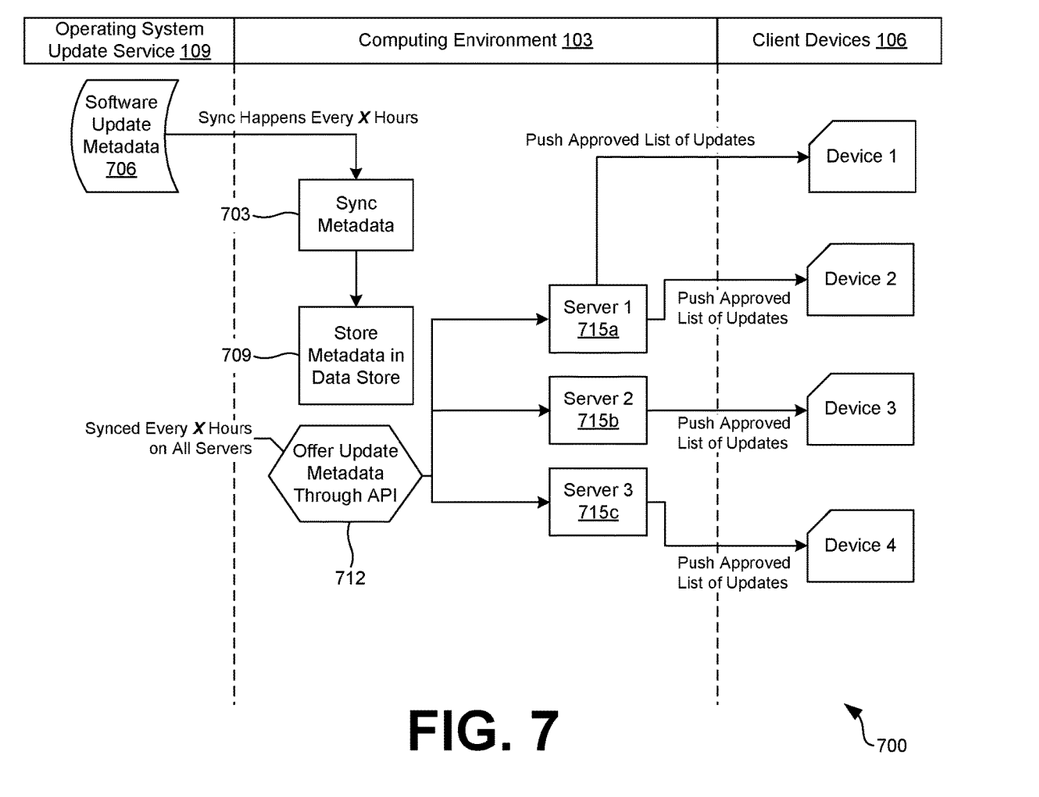
FIG. 7 is a sequence diagram illustrating functionality implemented by components of the networked environment.

Turning now to FIG. 7, shown is a sequence diagram 700 that provides one example of the operation of a portion of the networked environment 100. The flowchart of FIG. 7 can be viewed as depicting an example of elements of a method implemented by the operating system update service 109, the computing environment 103, the client devices 106, as well as other devices described in the networked environment 100 according to one or more examples. The separation or segmentation of functionality as discussed herein is presented for illustrative purposes only.

Beginning with step 703, the computing environment 103 can synchronize, or sync, with the operating system update service 109 to obtain software update metadata 706. Software update metadata 706 can include information pertaining the one or more software updates 145 that are available (or were available) for installation on one or more client devices 106. In some examples, the software update metadata 706 pertaining to software updates 145 includes a type of the update, a revision number, a title of the update, a description of the update, an update classification, a date and time when the metadata for the revision of the update finished downloading, a date and time when the revision of metadata for the update was authored, whether the update is a WSUS infrastructure update, whether the update was declined, a severity rating, a publication state of the update, an original source of the update, a knowledge base (KB) article number that describes an issue related to or fixed by the update, a security bulletin number that describes security issues and changes that are related to the update, whether the update installation program may request input from the user, whether the installation of the update requires network connectivity, impact to the user and other applications when installing the update on the client device, restart behavior of the update, as well as other information. In some examples, the computing environment 703 can sync with the operating system update service 109 to obtain software update metadata 706 at predefined intervals, such as every two hours or other appropriate interval.

Next, in step 709, the software update metadata 706 can be stored in the data store 115, for examples, as software update data 130. The software update data 130 can thus be queried by the computing environment 103 to provide administrators with information associated with various software updates 145.

In step 712, the computing environment 103 can offer the software update metadata 706 through one or more application programming interfaces (APIs). In some examples, the computing environment 103 can include distributed computing resources, such as distributed servers 715a . . . 715c (collectively "distributed servers 715") in one or more geographic locations that oversee operation of various ones of the client devices 106. The computing environment 103 can provide one or more APIs that respond to requests from the distributed servers 715 for software update metadata 706, which can be provided to administrators of the management service 118. In some examples, the software update metadata 706 is synced with the distributed servers 715 at predefined intervals, such as every twenty-four hours or other appropriate interval. Additionally, once specified by an administrator, the distributed servers 715 can push an approved list of updates to various one of the client devices 106.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application, and potentially other applications. Also stored in the memory can be a data store 115 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 169 generated by the client application or another application can be rendered. In some examples, the user interface 169 can be generated using user interface data provided by the computing environment 103. The client device 106 can also include one or more input/output devices that can include, for example, a capacitive touchscreen or other type of touch input device, fingerprint reader, or keyboard.

Although the management service 118, the client application, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying program instructions executable in at least one computing device that, when executed by the at least one computing device, cause the at least one computing device to:
   publish, to an agent application on a client device enrolled in a management service, a deployment profile comprising a setting that specifies at least one restriction associated with download or installation of software updates by a subset of client devices comprising the client device;
   receive, from the agent application, an identification of a software update available for the client device;
   provide software update metadata associated with the software update to an administrator console associated with the management service based on a query for the software update, wherein the software update metadata is received as part of a synchronization with an operating system update service;

receive, in the administrator console associated with the management service, a specification of the subset of client devices to apply the software update; and in response to an input being received in the administrator console, direct the agent application of at least one client device in the subset of client devices to install the software update based on identifying the deployment profile as being applicable to the at least one client device in an instance in which the deployment profile has been published.

2. The non-transitory computer-readable medium of claim 1, wherein the at least one computing device is further directed to:

obtain, from a software update service, metadata associated with the software update.

3. The non-transitory computer-readable medium of claim 1, wherein the specification is according to a user group.

4. The non-transitory computer-readable medium of claim 1, wherein the setting specifies a particular type of software update that requires an administrator approval before installation of the particular type of software update on the at least one client device.

5. The non-transitory computer-readable medium of claim 4, wherein the input specifies the administrator approval.

6. The non-transitory computer-readable medium of claim 1, wherein the software update comprises an update to a software component of the at least one client device.

7. A system, comprising:

at least one computing device; and program instructions executable in the at least one computing device that, when executed, cause the at least one computing device to:

publish, to an agent application on a client device enrolled in a management service, a deployment profile comprising a setting that specifies at least one restriction associated with download or installation of software updates by a subset of client devices comprising the client device;

receive, from the agent application, an identification of a software update available for the client device;

provide software update metadata associated with the software update to an administrator console associated with the management service based on a query for the software update, wherein the software update metadata is received as part of a synchronization with an operating system update service;

receive, in the administrator console associated with the management service, a specification of the subset of client devices to apply the software update; and in response to an input being received in the administrator console, direct the agent application of at least one client device in the subset of client devices to install the software update based on identifying the deployment profile as being applicable to the at least one client device in an instance in which the deployment profile has been published.

8. The system of claim 7, wherein the program instructions, when executed, further direct the at least one computing device to:

obtain, from a software update service, metadata associated with the software update.

9. The system of claim 7, wherein the specification is according to a user group.

10. The system of claim 7, wherein the setting specifies a particular type of software update that requires an administrator approval before installation of the particular type of software update on the at least one client device.

11. The system of claim 10, wherein the input specifies the administrator approval in the administrator console.

12. The system of claim 10, wherein the program instructions, when executed, further direct the at least one computing device to cause, in the administrator console, a display of an approval status corresponding to the administrator approval.

13. The system of claim 7, wherein publishing the deployment profile to the agent application on the client device causes the agent application to delay or prevent installation of the software update.

14. The system of claim 7, wherein the software update comprises an update to a software component of the at least one client device.

15. A computer-implemented method, comprising:

publishing, to an agent application on a client device enrolled in a management service, a deployment profile comprising a setting that specifies at least one restriction associated with download or installation of software updates by a subset of client devices comprising the client device;

receiving, from the agent application, an identification of a software update available for the client device;

providing software update metadata associated with the software update to an administrator console associated with the management service based on a query for the software update, wherein the software update metadata is received as part of a synchronization with an operating system update service;

receiving, in the administrator console associated with the management service, a specification of the subset of client devices to apply the software update; and in response to an input being received in the administrator console, directing the agent application of at least one client device in the subset of client devices to install the software update.

16. The computer-implemented method of claim 15, further comprising:

obtaining, from a software update service, metadata associated with the software update.

17. The computer-implemented method of claim 15, wherein the specification is according to a user group.

18. The computer-implemented method of claim 15, wherein the setting specifies a particular type of software update that requires an administrator approval before installation of the particular type of software update on the at least one client device.

19. The computer-implemented method of claim 15, wherein publishing the deployment profile to the agent application on the client device causes the agent application to delay or prevent installation of the software update.

20. The computer-implemented method of claim 15, further comprising:

synchronizing the software update metadata with the operating system update service based on a predefined interval.

* * * * *